(12) United States Patent
Rodriguez et al.

(10) Patent No.: US 11,610,213 B2
(45) Date of Patent: Mar. 21, 2023

(54) SYSTEMS AND METHODS FOR PROACTIVELY RESPONDING TO VENDOR SECURITY ASSESSMENTS

(71) Applicant: WHISTIC INC., Pleasant Grove, UT (US)

(72) Inventors: Juan C. Rodriguez, Sandy, UT (US); Jeffrey Dotson, Provo, UT (US); Nicholas Sorensen, American Fork, UT (US)

(73) Assignee: WHISTIC INC., Pleasant Grove, UT (US)

( * ) Notice: Subject to any disclaimer, the term of this patent is extended or adjusted under 35 U.S.C. 154(b) by 8 days.

(21) Appl. No.: 16/572,002

(22) Filed: Sep. 16, 2019

(65) Prior Publication Data
US 2020/0090197 A1    Mar. 19, 2020

Related U.S. Application Data

(60) Provisional application No. 62/732,980, filed on Sep. 18, 2018.

(51) Int. Cl.
*G06Q 30/0203* (2023.01)
*G06N 7/01* (2023.01)

(52) U.S. Cl.
CPC ........... *G06Q 30/0203* (2013.01); *G06N 7/01* (2023.01)

(58) Field of Classification Search
None
See application file for complete search history.

(56) References Cited

U.S. PATENT DOCUMENTS

| | | | |
|---|---|---|---|
| 10,089,285 B2 | 10/2018 | Rameshkumar et al. | |
| 11,151,233 B2 | 10/2021 | Brannon et al. | |
| 2005/0192963 A1* | 9/2005 | Tschiegg | G06Q 40/08 707/999.102 |
| 2014/0046894 A1* | 2/2014 | Bradley | G06Q 10/06 706/52 |

(Continued)

FOREIGN PATENT DOCUMENTS

WO    WO-2009061689 A1 *  5/2009    ......... G06Q 10/0635

OTHER PUBLICATIONS

Clemens Martin et al., Automating Information Security Assessments Using Intelligent Software Agents, 2016, 14th Annual Conference on Privacy, Security and Trust (PST) (Year: 2016).*

*Primary Examiner* — Shelby A Turner
*Assistant Examiner* — Matthew H Divelbiss
(74) *Attorney, Agent, or Firm* — Dorsey & Whitney LLP

(57) ABSTRACT

Systems to establish a security profile may include a memory to store original text from security questionnaires, and values associated with the original text from the questionnaires, the values indicating a section, a control, or a question of the original text. The system may also include a processing unit. The processing unit can identify a set of latent topics present in the original text from the stored security questionnaires, score the original text based on presence or absence of latent topics, receive a new security questionnaire, score the new text from the new security questionnaire based on presence or absence of latent topics, compute a distance between the scored original text from the stored security questionnaires and the scored new text from the new security questionnaire, and link the original text to the new text with a smallest distance between.

19 Claims, 14 Drawing Sheets

(56) References Cited

U.S. PATENT DOCUMENTS

2014/0075004 A1\* 3/2014 Van Dusen ............ G06Q 10/10
　　　　　　　　　　　　　　　　　　　　　　　709/223
2018/0129989 A1\* 5/2018 Bowers .............. G06Q 10/0635
2019/0377867 A1\* 12/2019 Murphy .............. H04L 63/1441

\* cited by examiner

FIG. 4 sotrek whistic

Questionnaires Title*

Questionnaires Description

Import | Use Existing ★ | Save Draft | Publish

Help ∨ Samuel

Jump To: ▼

⊘ Upload Questionnaire ——— ② Map Values ——— ③ Finish

Map Whistic Values to Your Values

Whistic Value ← 527    Your Value

Section Name            [Required*  ▸] ← 528

Control Name            [Recommended ▸]

Question Text           [Required*  ▸]

Compliant Answer

Back                                    Next

⊙ Required   +  ▪

| Current Questionnaire | Questionnaire 1 | Questionnaire 2 | Questionnaire 3 | Questionnaire 4 | Questionnaire 5 | Questionnaire 6 |
|---|---|---|---|---|---|---|
| Control or Question 1 | X | | | | | X |
| Control or Question 2 | | X | X | X | X | |
| Control or Question 3 | | | X | | X | |
| Control or Question 4 | X | | X | X | X | X |
| Control or Question 5 | X | X | | | | X |
| Control or Question 6 | X | X | X | X | | |
| Control or Question 7 | X | | X | | X | X |
| Control or Question 8 | X | | | | | |

FIG. 11

The Mapping Process

SYSTEMS AND METHODS FOR PROACTIVELY RESPONDING TO VENDOR SECURITY ASSESSMENTS

RELATED APPLICATIONS

This application claims the benefit under 35 U.S.C. § 119(e) of U.S. Provisional Application No. 62/732,980 entitled SYSTEMS AND METHODS FOR PROACTIVELY RESPONDING TO VENDOR SECURITY ASSESSMENTS, filed Sep. 18, 2018, which is hereby incorporated by reference herein in its entirety.

TECHNICAL FIELD

The present disclosure is directed to vendor security assessments, and more specifically to the process of preparing and communicating information in order to satisfy a request to complete a vendor security assessment questionnaire.

BRIEF DESCRIPTION OF THE DRAWINGS

FIG. 4 is an interface for a security assessment management system that facilitates the process of selecting a file to import as a questionnaire, according to one embodiment.

FIG. 5 is an interface for a security assessment management system that facilitates the association of values in the system to values in a questionnaire spreadsheet, according to one embodiment.

FIG. 11 is an interface for a security assessment management system that allows for the viewing of the contents of a security questionnaire as it relates to a variety of questionnaires or frameworks at the same time, according to one embodiment.

DETAILED DESCRIPTION OF PREFERRED EMBODIMENTS

Figure 1:
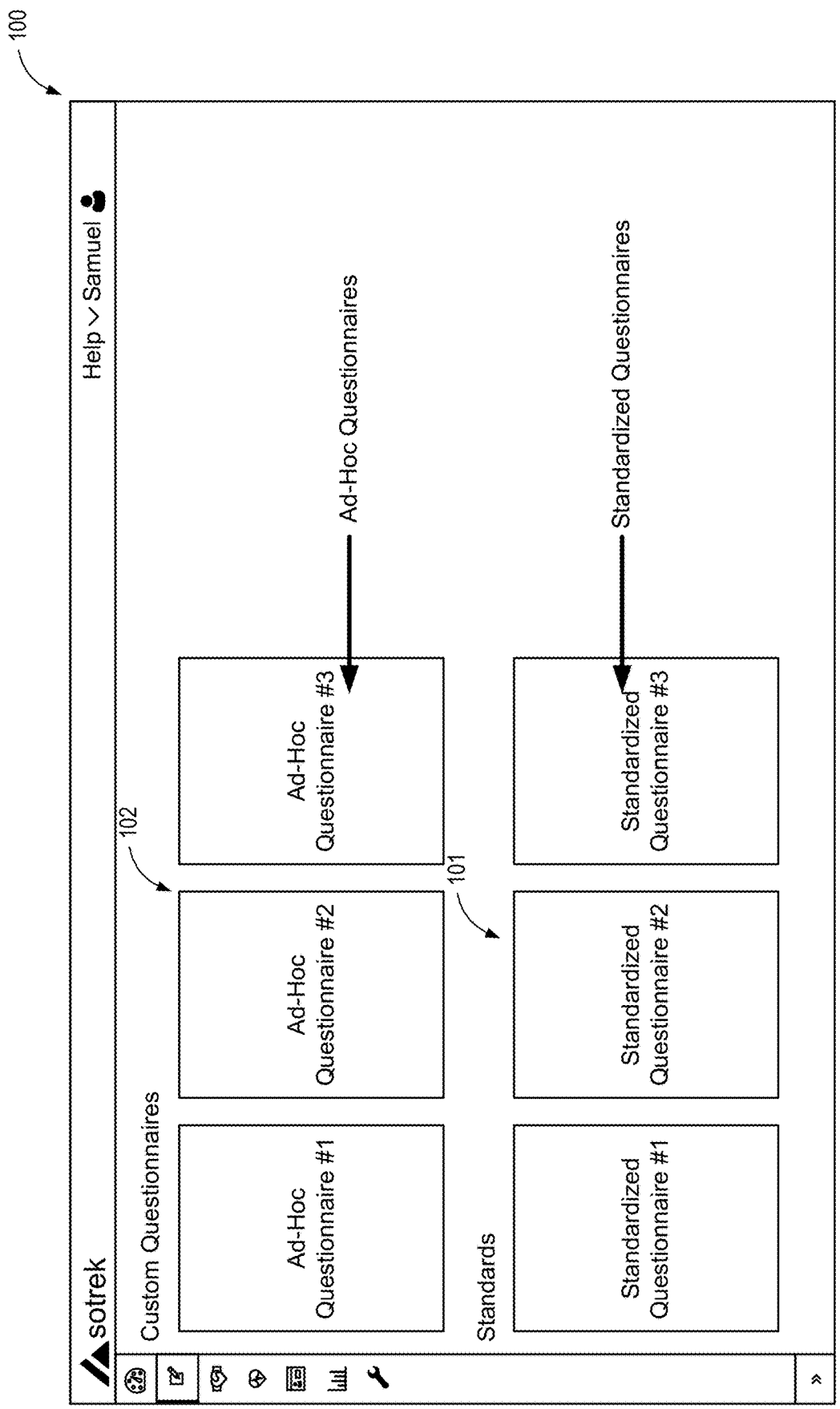
FIG. 1 is graphical user interface (GUI) for a security assessment management system that enables the browsing of existing standardized questionnaires or ad-hoc questionnaires created in, or imported into, the system, according to one embodiment.

In the course of operating its business, a company may choose to outsource certain business processes, functions, and applications to third-party vendors. In the case where third-party vendors will be processing or storing sensitive information (e.g., an outsourced payroll provider with access to employee social security numbers) or have access to sensitive systems (e.g., an email software provider that integrates with core business applications), there are not only business risks involved with outsourcing to a third-party vendor, but also information security risks or cybersecurity risks. These risks may materialize, for example, when a third-party vendor is the source of a data breach that impacts its customers or exposes the data entrusted to the third-party vendor by its customers.

In order to mitigate this information security risk, many organizations will perform a security risk assessment on each of its third-party vendors prior to doing business with them. In many cases, the assessment is centered around the gathering of documentation and associated information in the form of a questionnaire, often housed in an Excel spreadsheet, with relevant questions designed to determine if the third-party vendor can be trusted to provide an equal or greater level of security to the data than the company would be providing if it were not outsourcing this function.

A typical vendor security assessment involves two parties: the customer looking to purchase from the vendor is the one performing the assessment, and the vendor looking to sell something to the customer is the one in need of responding to the information request so that the assessment can be completed.

In certain industries and in certain legal jurisdictions, performing this type of due diligence on third-party vendors is a regulatory requirement.

A number of different standardized frameworks have been developed by standards bodies, industry associations, non-profit organizations, government departments, regulatory bodies, and other groups in an attempt to agree upon the most important security controls that should be in place in order to limit the risk of a cybersecurity incident. These frameworks have been widely adopted by companies throughout the world. Examples of the organizations that create these standardized frameworks include the International Organization for Standards (i.e., ISO 27001/27002), the National Institute of Standards and Technology (i.e., NIST 800-53/800-171), and the Center for Internet Security (i.e., CIS Top 20 Critical Security Controls).

These frameworks are typically organized as a set of security controls or principles that a company should abide by in order to improve security and reduce risk. While they are not typically initially organized as a set of questions requiring "yes/no" or "text" responses (as encountered in a questionnaire format), many of these frameworks have been converted into questionnaires (e.g., standardized questionnaires) and utilized as the baseline set of questions for companies to ask a third-party vendor when conducting vendor security assessments.

Some companies have put together their own questionnaires based on these standardized frameworks. These companies created questionnaires that are referred to herein as ad-hoc questionnaires. An ad-hoc questionnaire may vary slightly or significantly from the standardized frameworks. For example, some companies may simply translate the standardized frameworks to generate an ad-hoc questionnaire.

As companies have translated these frameworks into vendor security assessment questionnaires for many years, a significant number of variants (that have originated from a small number of similar sources) have been created. Even in cases where an association or standards body has published an official version of a framework as a questionnaire, these questions have often been rewritten and altered and can often be found to have slight or major variations from the original format—all with the same intention or purpose.

In addition, as many of the frameworks were designed to cover a broad spectrum of cybersecurity controls and related principles, many companies find that they cannot utilize a framework "off the shelf" to conduct a vendor assessment questionnaire because it may cover areas potentially irrelevant to the scope of the vendor engagement or it may not align with the level of scrutiny necessary in a particular engagement. As a result, another source of variation in an ad-hoc questionnaire is created as companies pick and choose only the most relevant aspects of frameworks based on their industry or use-case or combine different portions of two or more separate frameworks or rewrite portions of a framework or otherwise customize the questions utilized in a vendor assessment questionnaire.

In addition to the variation described above, there are nuances to vendor security assessment questionnaires that further complicate the vendor assessment process. For example, many of the same cybersecurity-specific questions are asked multiple times in a questionnaire, across different sections (i.e., in the "Network Security" section or in the "Application Security Section") and yet each question will require a different response based on the context of the question.

The wide variation that exists across vendor security assessments has resulted in a very laborious, time-consuming, manual back-and-forth process for exchanging information during vendor security assessment. Although many of the questions that are asked across vendor assessments conducted by different customers come from similar sources and are asked for the same ultimate purpose, companies are required to work through these questions one by one without regard to the framework they were derived from or without the ability to easily view the questions in the context of an industry standard.

The wide variation that exists across ad-hoc questionnaires has resulted in a very laborious, time-consuming, manual back-and-forth process for exchanging information during vendor security assessment. Described herein are systems, methods, and apparatuses for improving responses to ad-hoc vendor security assessments. Embodiments herein provide mapping between ad-hoc questionnaires and standardized security frameworks. In some embodiments, a response system generates a response by providing a standardized framework corresponding to the ad-hoc questionnaire. In some embodiments, a response system generates a response by auto-populating the answers to the ad-hoc questionnaire based on mapping.

The present disclosure relates to embodiments of a system that facilitates the mapping of the questions contained in an ad-hoc vendor security assessment questionnaire (ad-hoc questionnaire) to related industry standard cybersecurity frameworks that contain questions that address the same or nearly identical topics. An ad-hoc questionnaire is a questionnaire that differs from a standardized questionnaire. The present disclosure further relates to embodiments of a system that facilitates the mapping of a question in an ad-hoc or standardized vendor security assessment questionnaire to a related question in another ad-hoc or standardized questionnaire.

In some embodiments, the system provides suggested matches and pre-populates responses to questions asked in an ad-hoc vendor security assessment questionnaire based on their level of similarity to questions covered by a standardized framework(s) or previously completed ad-hoc questionnaires. This enables a system to build up a bank of questions and responses to standardized questionnaires or ad-hoc questionnaires. When a potential or existing customer requests the user to complete an ad-hoc questionnaire, embodiments herein provide a response by either delivering a standardized questionnaire or auto-populating the answers to the ad-hoc questionnaire based on mapping those questions to the previously answered questions in the question bank.

In some embodiments, the system may generate a security profile that a user may share based on the ad-hoc questionnaires, related documents, and standardized questionnaires.

Additional aspects and advantages will be apparent from the following detailed description of embodiments, which proceeds with reference to the accompanying drawings.

Upon receipt of an ad-hoc questionnaire, some embodiments of the system identify source(s) (e.g., standardized questionnaires, or other ad-hoc questionnaires stored in the system) of the ad-hoc questionnaire, and determine how closely the ad-hoc questionnaire maps to the identified source(s). By identifying the different source(s) of the questions contained in ad-hoc questionnaires, the system provides context to a user for the questions that they are being asked to complete.

In some embodiments, the system enables users to proactively complete questionnaires within the system (or import questionnaires from spreadsheet format). The system then combines these responses to standardized questionnaires and ad-hoc questionnaires with associated documentation, audit reports, compliance certificates, and other information pertinent to a vendor security assessment in an online profile that can be shared with potential or existing customers or other third parties for a variety of purposes, including to satisfy a vendor assessment questionnaire request. The system may thus enable users to proactively prepare for vendor assessments in anticipation of future requests, and rely on the system to map existing information with requested information.

In some embodiments, the system allows users to respond to vendor assessment requests received via various methods. For example, if the company performing the vendor assessment is an existing user of the system, the questionnaire and responses will be communicated entirely via the system without the use of spreadsheets. However, if the requester is not a user of the system and sends a request via a PDF, Word document, spreadsheet or other document type to an existing user of the system, the user can import the document into the system and use the system to generate the response and communicate the results to the requester. The system may allow the requester to login to the system to view the results communicated via the system or export them into a PDF, Word document, spreadsheet or other document type. In some embodiments, the system can allow the user to export the results and share them without the system.

It will be readily understood that the components of the embodiments as generally described below and illustrated in the Figures herein could be arranged and designed in a wide variety of configurations. For instance, the steps of a method do not necessarily need to be executed in any specific order, or even sequentially, nor do the steps need to be executed only once. Thus, the following more detailed description of various embodiments, as described below and represented in the Figures, is not intended to limit the scope of the disclosure, but is merely representative of various embodiments. While the various aspects of the embodiments are presented in drawings, the drawings are not necessarily drawn to scale unless specifically indicated.

Embodiments and implementations of blast planning systems and methods described herein may include various steps, which may be embodied in machine-executable instructions to be executed by a computer system. A computer system may include one or more general-purpose or special-purpose computers (or other electronic devices). The computer system may include hardware components that include specific logic for performing the steps or may include a combination of hardware, software, and/or firmware.

Embodiments may be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables; telephone lines; radio waves; satellites; microwave relays; modulated AC power lines; physical media transfer; and/or other data transmission "wires" known to those of skill in the art. The network may encompass smaller networks and/or be connectable to other networks through a gateway or similar mechanism.

Each computer system includes one or more processors and/or memory; computer systems may also include various input devices and/or output devices. The processor may include a general-purpose device, such as an Intel®, AMD®, or other "off-the-shelf" microprocessor. The processor may include a special-purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, RAM, flash memory, and other computer system storage devices. The physical configuration represents data and instructions which cause the computer system to operate in a specific and predefined manner as described herein.

Suitable software to assist in implementing the embodiments described herein may be readily provided by those of skill in the pertinent art(s) using the teachings presented here and programming languages and tools, such as Java, Pascal, C++, C, PHP, .Net, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Aspects of certain embodiments may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implement particular abstract data types. A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media.

Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network. According to one embodiment, a database management system (DBMS) allows users to interact with one or more databases and provides access to the data contained in the databases.

Preparing the System

FIG. 1 is a graphical user interface (GUI) 100 for a security assessment management system. The GUI 100 allows users to browse existing standardized questionnaires 101 or ad-hoc questionnaires 102 created in, or imported into, the security assessment management system, according to one embodiment. The GUI 100 of the security assessment management system facilitates security assessment responses and security profile management. The user's interaction with the security assessment management system, in one embodiment, may begin as the user determines which standardized questionnaires are relevant to the user's business and will be a useful starting point for satisfying future vendor assessment requests. The user selects the desired questionnaire using the GUI 100 and proceeds to answer the security questionnaire.

As shown, the system may present to the user a catalog of existing standardized questionnaires 101. The user may review the catalog by accessing each questionnaire in the interface. A user input representing a selection of a specific questionnaire may cause the specific questionnaire to open within the GUI to allow the user to review and/or answer questions contained in each questionnaire and the topics addressed by the questionnaire.

Figure 2:
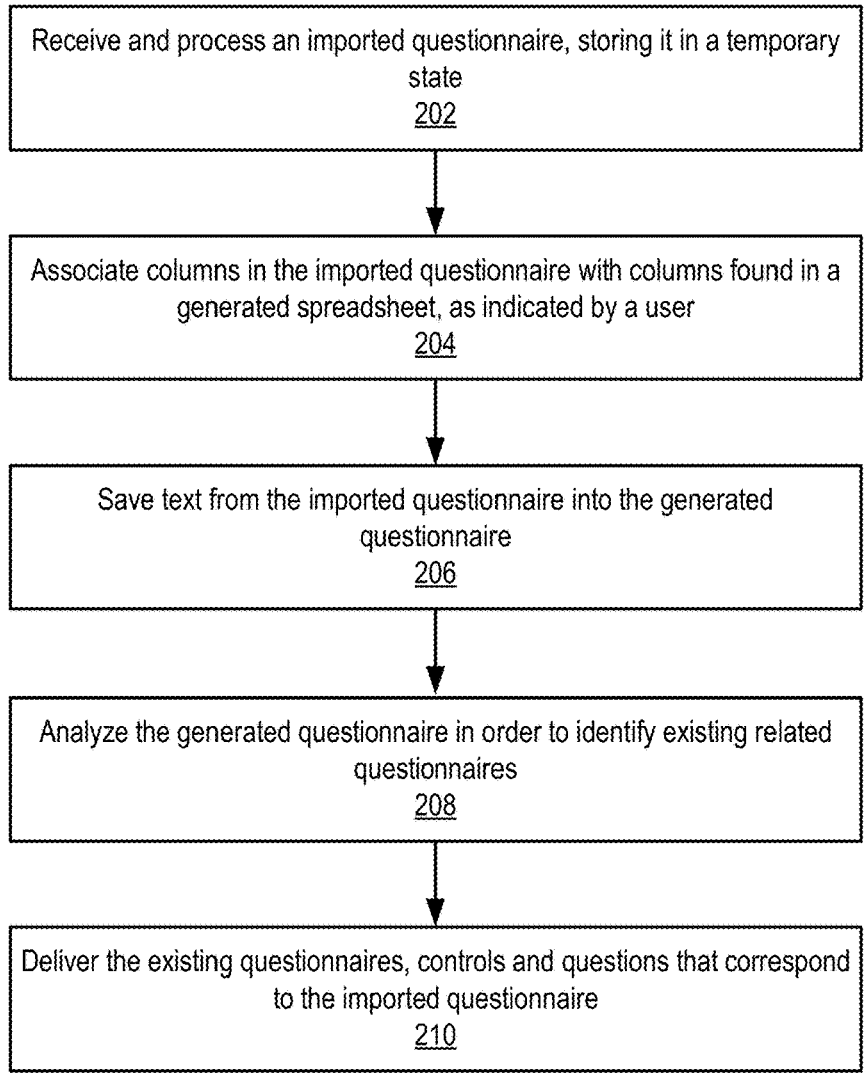
FIG. 2 illustrates a flow chart of a method to import a spreadsheet questionnaire into the system, according to one embodiment.

FIG. 2 illustrates a flow chart of a method 200 for importing a questionnaire into a security assessment management system, according to one embodiment. The security assessment management system may utilize the import workflow to import spreadsheets or documents containing questions from previously completed vendor assessment questionnaires to determine which standardized questionnaires contain questions that are related to the questions contained in previous ad-hoc questionnaires, in an effort to determine which framework will most likely satisfy future ad-hoc vendor assessment questionnaire requests.

The security assessment management system may receive and process 202 an imported questionnaire, storing it in a temporary state until the full import process is complete. The imported questionnaire may include questions, controls and sections. The imported questionnaire may be a spreadsheet divided into a series of rows and columns.

The security assessment management system may associate 204 columns in the imported questionnaire with columns in a newly generated spreadsheet. Each of the columns may be associated with a category. For example, the columns may represent section headings, control headings, control text, control comments, question identifier, question text, question comments, or question answers. In one embodiment, the security assessment management system may receive input from the user indicating the association between column and category of the generated spreadsheet and the columns of the imported questionnaire.

The security assessment management system may save 206 text and other items from the imported questionnaire into the generated questionnaire. The generated questionnaire may represent a final state of the imported questionnaire. The generated questionnaire orders the text such that sections, controls, and questions and their relationships are identifiable.

The security assessment management system may analyze 208 the generated questionnaire, using a mapping process described below, in order to identify existing ad-hoc or standardized questionnaires that relate to this imported questionnaire. The security assessment management system may deliver 210 the existing questionnaires that correspond to the imported questionnaire, including the specific correspondence for the questionnaire as a whole as well as by control and question (as described in reference to FIG. 7).

Figure 3:
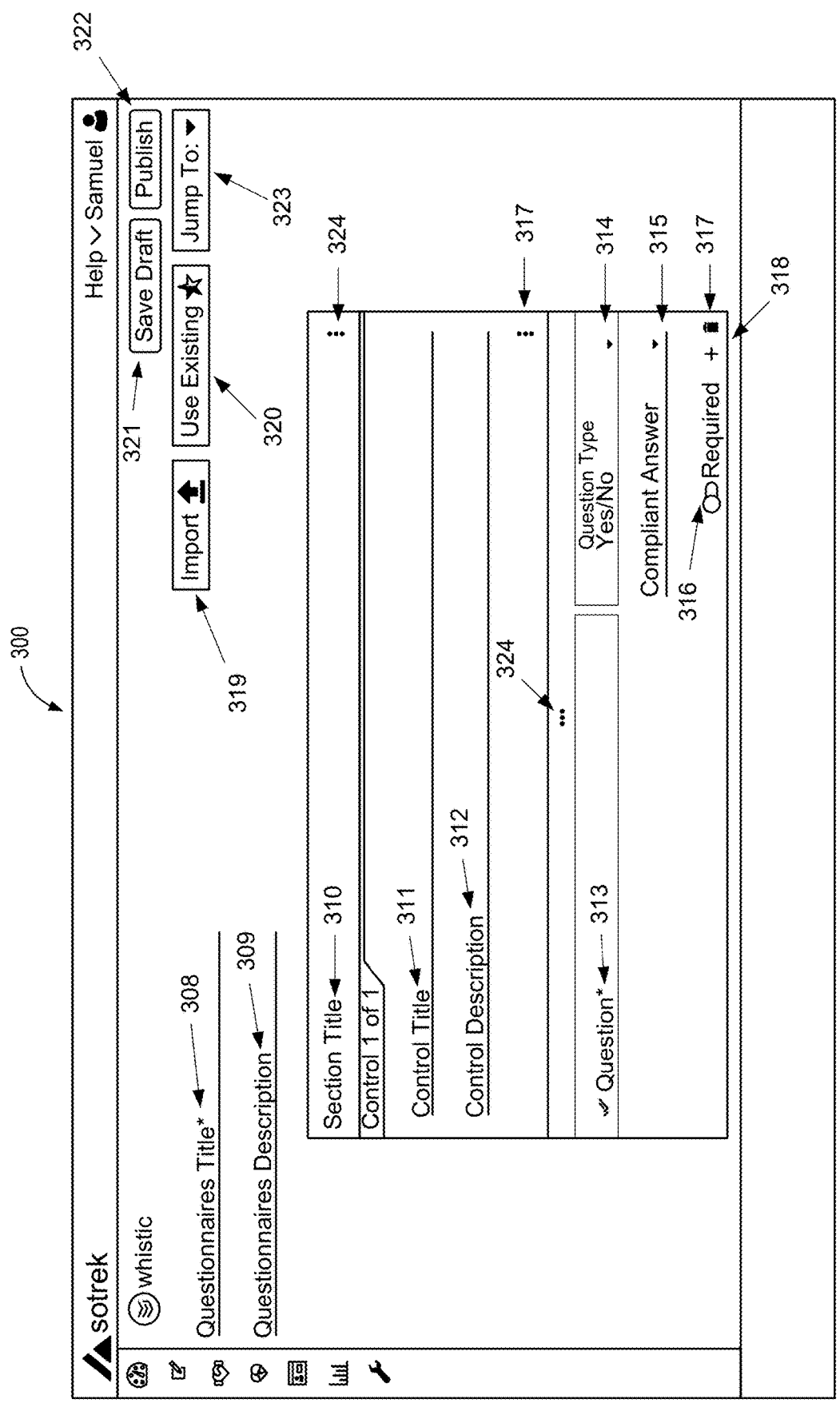
FIG. 3 is an interface for a security assessment management system that facilitates the creation of new ad-hoc questionnaires or imports questionnaires into the system, according to one embodiment.

FIG. 3 is a GUI 300 for a security assessment management system that allows users to create new ad-hoc questionnaires or import questionnaires into the system.

The GUI 300 may include a questionnaire title field 308 and a questionnaire description field 309. These fields respectively allow for a name of the questionnaire and a detailed description for the questionnaire to be entered. A section title field 310 and a control title field 311 receive input for a name of the questionnaire to be entered and for a user to enter a control title. A control description field 312 receives input for a detailed description of an individual control. A question field 313 receives input for the full text of an individual question. A question type field 314 receives input for the selection of the question type from a list of supported types (i.e., Boolean, multiple choice, multiple answer, text, document upload, etc.). A compliant answer field 315 receives input, in one embodiment, for the definition of a compliant answer for the purposes of applying the CrowdConfidence Score and to facilitate, as a customer is reviewing a completed questionnaire from a vendor, an understanding of risk level and a comparison of a vendor's responses to other vendors who responded to the same questionnaire. The system determines the CrowdConfidence Score to rank companies according to their risk level, based on their responses to the same set of questions within a questionnaire.

A required toggle 316 allows for a question to be required or unrequired. The questions marked as required must be completed in a questionnaire before it can be returned. If a delete button 317 is pressed, the system deletes a question. If the additional question button 318 is selected by a user, the system allows, in one embodiment, for additional questions to be added to a questionnaire one by one. An import button 319 causes the questionnaire import workflow to initiate when selected.

A use existing button 320 allows the system to use an ad-hoc questionnaire to be built from any other existing ad-hoc or standardized questionnaire in the system. In one embodiment, the GUI 300 is used to customize an existing questionnaire. The save button 321 and the publish button 322 respectively cause the system to save a draft questionnaires or publish drafts for use in the system. A jump to button 323 provides a user with navigation (e.g., jumping to different sections of a questionnaire to minimize time scrolling through what may potentially be hundreds of questions). The order button 324 allows sections, controls, or questions to be reordered by using a method to drag and drop them in place.

Figure 4:
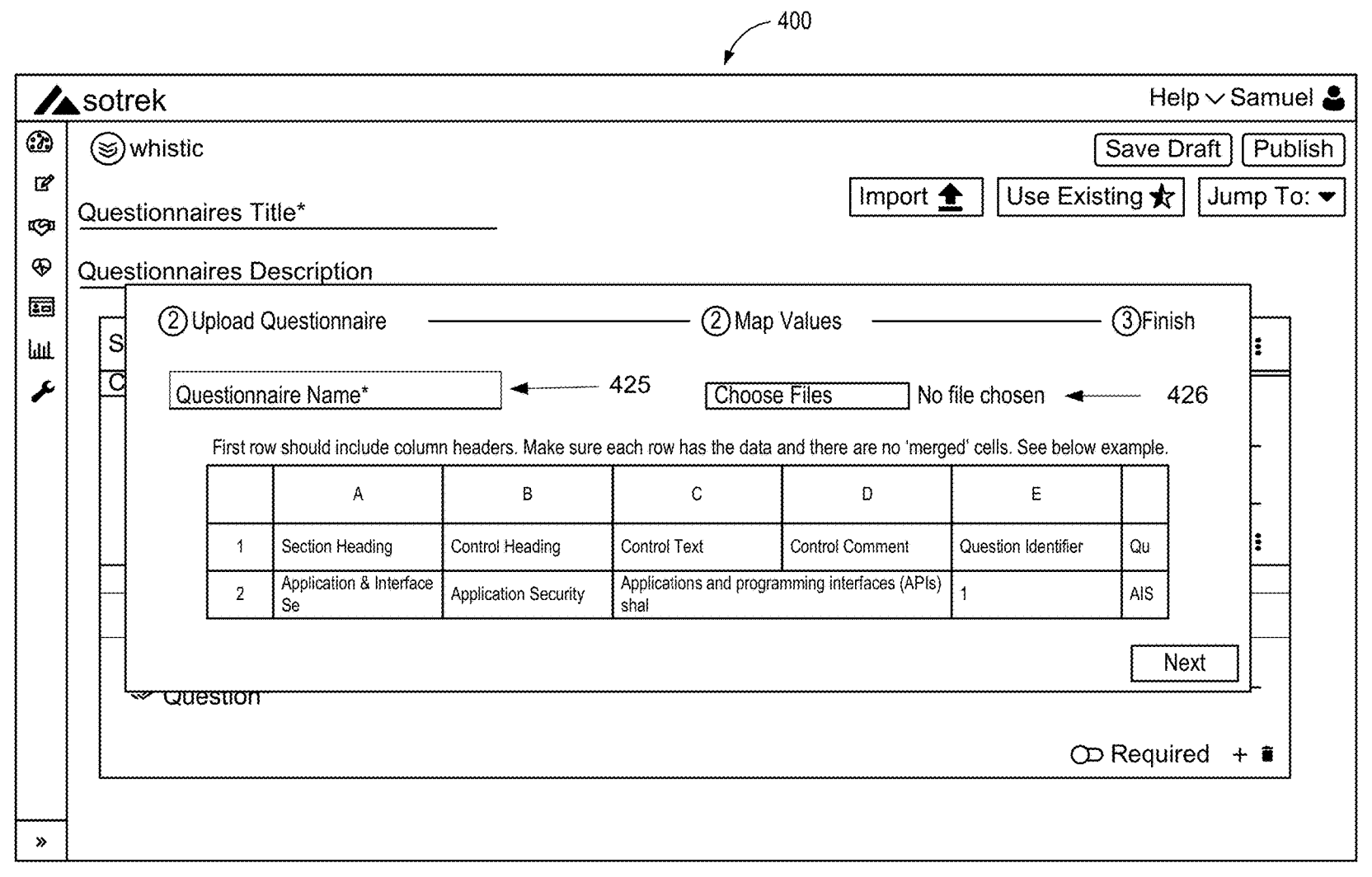

FIG. 4 is a GUI 400 for a security assessment management system that guides users through the process of selecting a file to import as a questionnaire. In a questionnaire name field 425, the system receives a name for the imported questionnaire. A file field 426 allows for a selected file to be uploaded from which the questionnaire will be imported into the system.

FIG. 5 is a GUI 500 for a security assessment management system that facilitates the association of values in the system to values in a questionnaire spreadsheet. A value may be contained in a column of a spreadsheet. In the system area 527, the system displays the naming convention for values in the system (i.e., Section Name, Control Name, Question Text). In the uploaded content area 528, the system reads an uploaded file, organizes the data and displays the data in order to allow values from the uploaded file to be associated with system values (e.g., section name, control name, question name).

Figure 6:
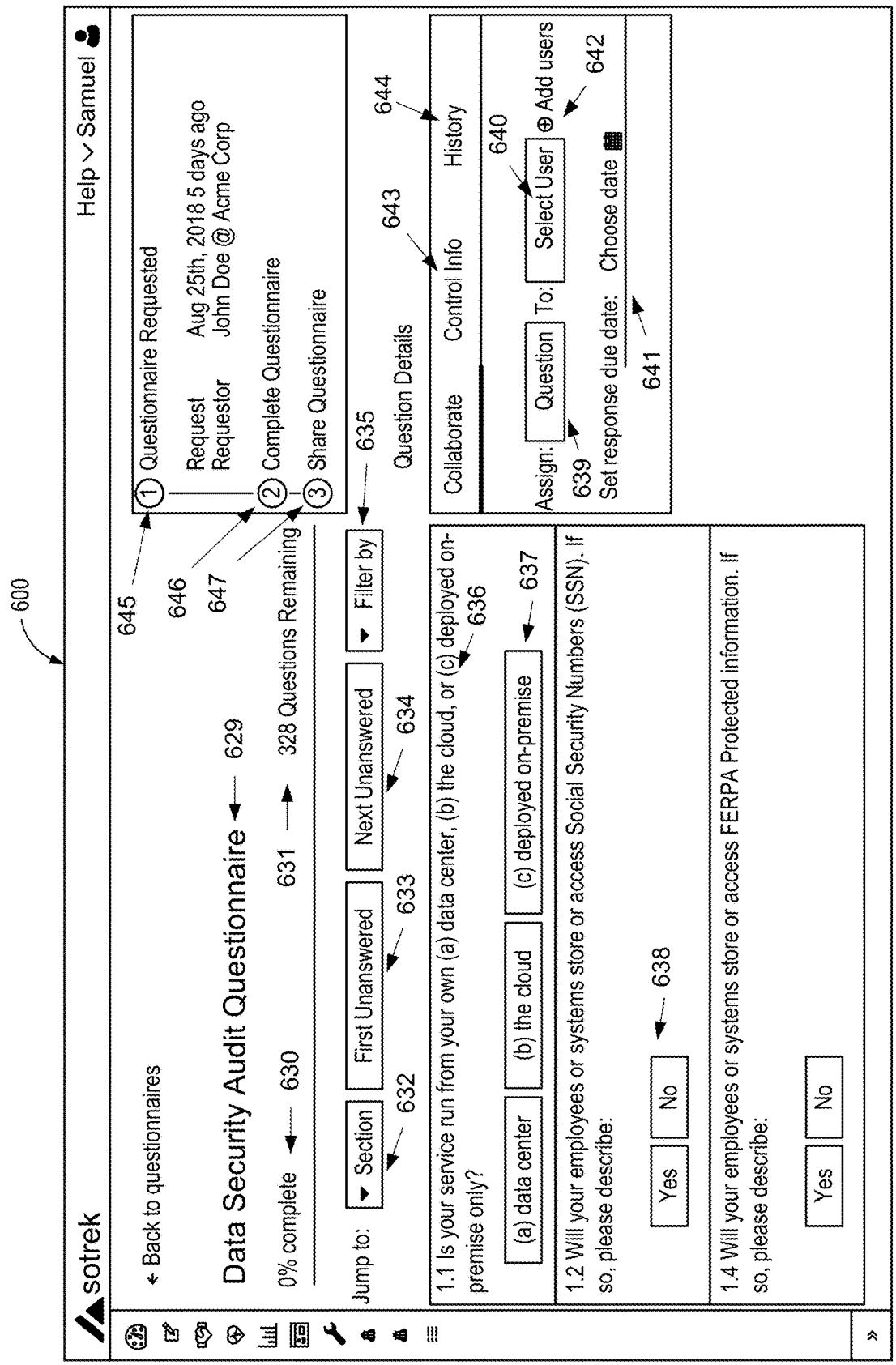
FIG. 6 is an interface for a security assessment management system that facilitates the answering of each question in a questionnaire according to one embodiment.

FIG. 6 is a GUI 600 for a security assessment management system that allows users to view the sections, controls, and questions in a questionnaire and answer the questions in a questionnaire, according to one embodiment. In one embodiment, when the user has selected which questionnaire(s) they would like to begin with (e.g., using the interface illustrated in FIG. 1), the system may present a questionnaire response interface (e.g., GUI 600) to complete the questionnaire(s).

In the title area 629, the system displays the name of the questionnaire. In the progress bar 630 and the questions remaining indicator 631, the system uses text displays and the progress bar 630 to communicate the percentage of completion and number of questions remaining in the questionnaire. In the section menu 632, the system allows for navigating to a specific section or control. With the first unanswered button 633 and the next unanswered button 634, the system allows for navigating to the first or next unanswered question respectively. With the filter menu 635, the system allows for the displayed questions to be narrowed down by a number of filters (e.g., Unanswered questions, Answered questions, Questions with comments, Questions assigned to the current user, Questions with a due date, etc.).

In a question area 636, the system displays the question text. In an answer area 637, the system displays the available multiple choice answers in one embodiment. In a second question area 638, the system displays another question with a Boolean response. In other embodiments, the system may display questions with multiple answer, open text, document upload, or other formats. The system may also display or hide additional questions using logic triggered by a previous question response or group of responses.

With the assign function 639, the system allows a section, control, or question to be assigned to a specific user, as indicated in the select user field 640. In the calendar field 641, the system allows for a due date to be associated with an assigned section, control, or question response. In one embodiment, the system notifies users of these assignments via automated email reminder sequences and adjusts the frequency of these emails as the due date approaches. With the add users button 642, the system allows for additional users to be added to the system via the interface. The system handles the email invitations sent to the users and guides users through registration and verification, prior to granting them access to the questionnaire. In a control field 643, the system displays control information related to each question, including the applicable control and control description. In a history field 644, the system displays a log of activity history for the selected question, which indicates which user answered the question and when, or which user changed a previous answer to the current answer and when that action was taken. In response to the user's actions that involve other users to participate in the questionnaire, the system can trigger automated email reminder sequences to remind the new user to complete the assigned task in a timely manner or by the assigned due date.

In some embodiments in which the questionnaire was requested by a customer, the system displays the date the questionnaire was requested, the individual, and the company that requested the questionnaire in the questionnaire requested field 645. In some embodiments, the system may display the contact information of the individual when their name is clicked. In the completed field 646 and the shared field 647, the system displays similar information related to the dates the questionnaire was started, completed, and shared back with the customer.

In some embodiments, the system may import spreadsheets containing previously answered questions from ad-hoc or standardized questionnaires, identify how well these answered questions complete any of the standardized questionnaires, and choose to pre-populate answers to questions from one or more standardized questionnaires by leveraging question bank mapping, which relies upon the results of a questionnaire mapping process as explained below. The system may then present to the user any unanswered questions in the standardized questionnaire. The user may answer the unanswered questions using the system's questionnaire response interface (e.g., GUI 600) in order to complete the questionnaire.

Figure 7:
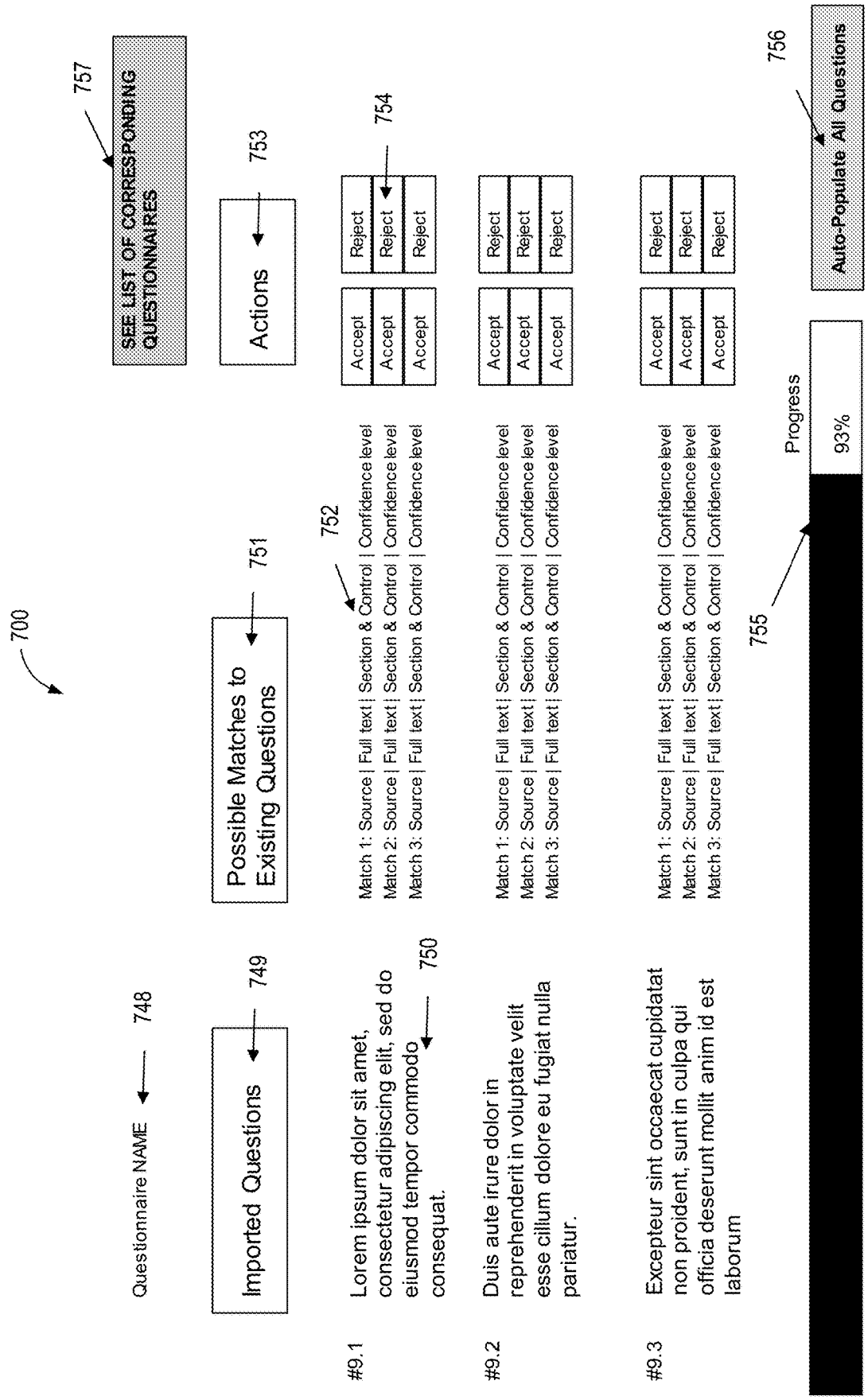
FIG. 7 is an interface for a security assessment management system for question bank mapping according to one embodiment.

FIG. 7 illustrates components of a question bank mapping GUI 700 for the system, according to one embodiment. In a name field 748, the system displays the name of the questionnaire that is currently being mapped. Under an imported questions tab 749, the system displays a section with the imported questions from the questionnaire. In a question field 750, the system displays the actual text of the imported question. Under a matches tab 751, the system displays a section with existing questions that are possible matches to the imported questions (found using the Mapping Process described below). In a match field 752, the system displays the details surrounding the possible matched question, which may include the questionnaire source, the full question text, the section and control, the confidence level of the match, or other related information.

Under the actions tab 753, the system displays the possible actions that are available related to the proposed matches. In 754, the system allows a question and answer to be matched to its corresponding imported question. In one embodiment, clicking "Accept" would populate the answer to the imported question and advance the progress bar, moving the system to display the next unanswered question. In one embodiment, the system stores data related to users' interaction with all of the questions across all of the system's users, and which questions were accepted as matches to other questions (or conversely, which questions were rejected as matches). The system then incorporates that feedback into the Mapping Process described below in order to learn over time and improve the accuracy of displayed matches.

In a progress bar 755, the system displays the progress of the questionnaire towards completion of unanswered questions. The auto-populate button 756 allows the system to completely auto-populate an imported questionnaire with existing answers, using the best-known match for every question. The correspondence button 757 of the system allows a list of corresponding questionnaires to be displayed in one embodiment where the user would like to see a higher level of mapping than on a question or control level.

Figure 8:
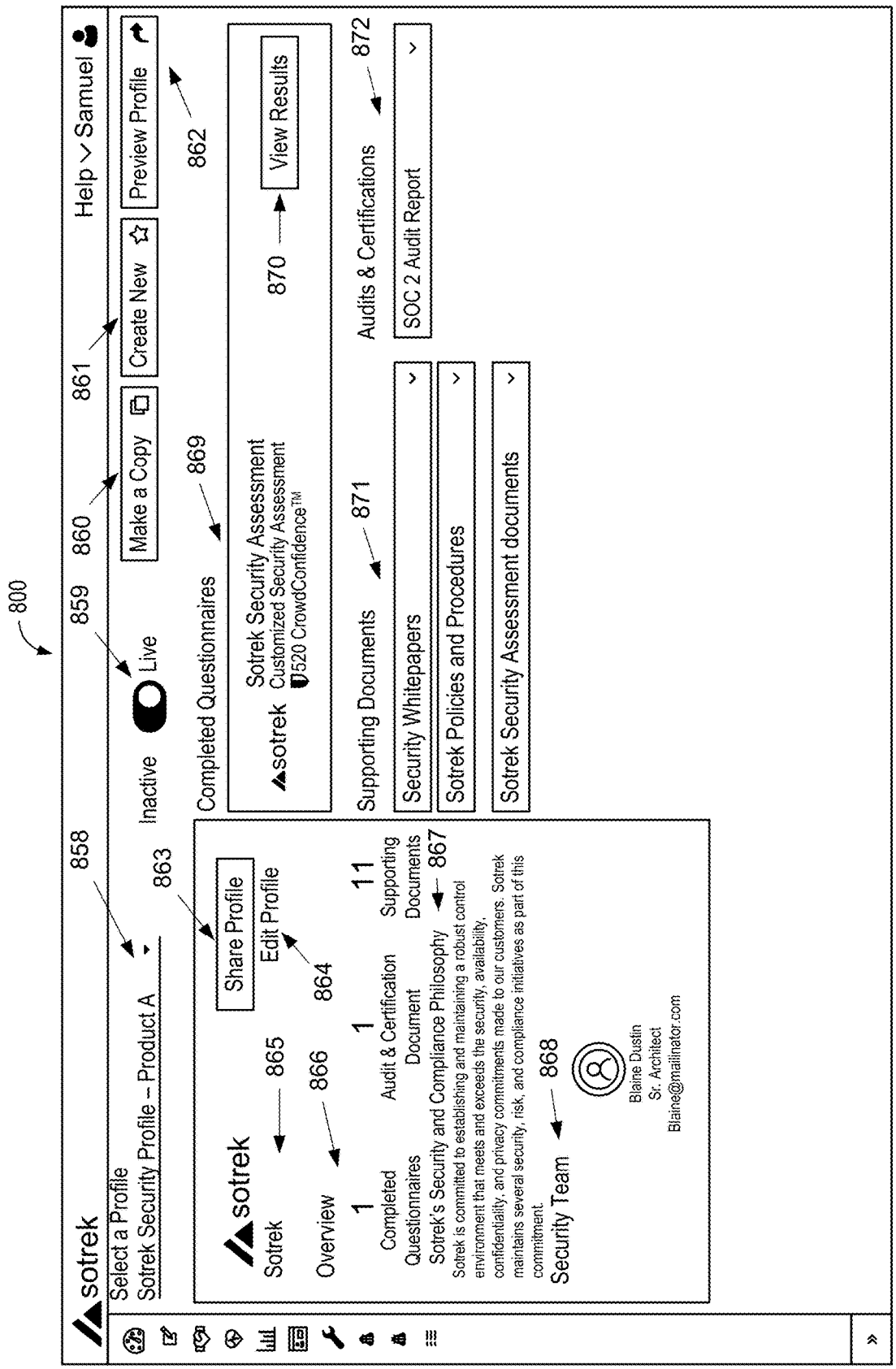
FIG. 8 is the Security Profile™ interface for a security assessment management system that enables the organization and preparation of information and the sharing of that information, according to one embodiment.

FIG. 8 is a Security Profile™ GUI 800 for a security assessment management system that enables the organization and preparation of information and the sharing of that information, according to one embodiment. Once the user has completed one or more of the standardized questionnaires, they may utilize the Security Profile™ GUI 800 to organize their completed questionnaires, associated documentation, certifications, and audit reports, and prepare this information to be communicated to potential and existing customers.

The product menu 858 allows the user of the system to organize multiple profile versions, each with a unique configuration of documentation, questionnaires, text, etc. Each profile version may be associated with a different product. The system allows the user to navigate to the different profile versions as indicated in the product menu 858, in order to view, edit, or share each profile version separately. A toggle 859 indicates the state of the profile. In one embodiment, a profile may be in an Inactive state (meaning that the profile version cannot be shared and is currently in an unfinished state), or in a Live state (meaning that the profile version is available to be shared).

A selection of the copy button 860 allows the profile to be copied. In one embodiment, the user may instruct the system to make a copy of the profile in order to generate another profile version that is similar, but not identical, to the current version without having to start from a blank profile. With the create button 861, the system allows a new profile to be created from a blank state. The preview button 862 of the system allows a profile to be previewed as it would be seen when shared with another user utilizing the "Share" function 863. The share function 863 of the system allows the profile to be shared. The system gathers the contact information of the intended recipient (i.e., name, email address, company, url, phone number, etc.) and allows a note to be drafted. The system may then deliver via email an invitation for the recipient to use the system to view the sender's Security Profile.

The system automatically may initiate subsequent email reminder sequences to both the recipient and the sender based on what actions the recipient has taken. For example, in one embodiment, if the recipient has not viewed the profile, the system will continue sending a variety of email reminders over the course of a specified calendar time period to the recipient, encouraging them to access the system to view the profile. The sender may also be sent email reminders informing them of the status of the recipient's interaction with the profile, including, in one embodiment, if the recipient viewed the profile, when they viewed the profile, what documents or questionnaires they viewed and when, what documents or questionnaires were downloaded and when, etc.

An edit button 864 allows the profile to be changed from a read-only state to an editable state, where each of the described components are available for use. In one embodiment, the system may restrict the ability of a given user or users to edit a profile, or allow a certain user or users to share a profile, based on the user privileges defined by another Administrator user.

In a company section 865, the system displays the name and logo of the company that owns the current profile. In an overview section 866, the system displays an overview section that contains a high-level description of the number of questionnaires, supporting documents, and/or audits and certification documents contained in the security profile. In another section 867, the system displays text input by the user. In one embodiment, the text is used to provide context to the recipient for the security profile and an introduction to the associated documentation and questionnaire(s). In the security team section 868, the system allows the display of the user's basic information in order to indicate which users are responsible for information security at the company.

In the completed questionnaires section 869, the system allows completed questionnaires to be added to the security profile. A view results button 870 of the system allows for the viewing of the complete questionnaire, including the responses and associated documentation, in an interface similar to the one described in reference to FIG. 6.

In the supporting documents section 871, the system allows for the uploading of supporting documentation and the organization of that documentation into folders. Documentation could be formatted in a variety of formats, including .XLS, .PDF, .DOCX or other file formats. In an audit and certifications section 872, the system allows for the uploading of documentation specifically containing audit reports or certifications and the organization of that documentation into folders.

Figure 9:
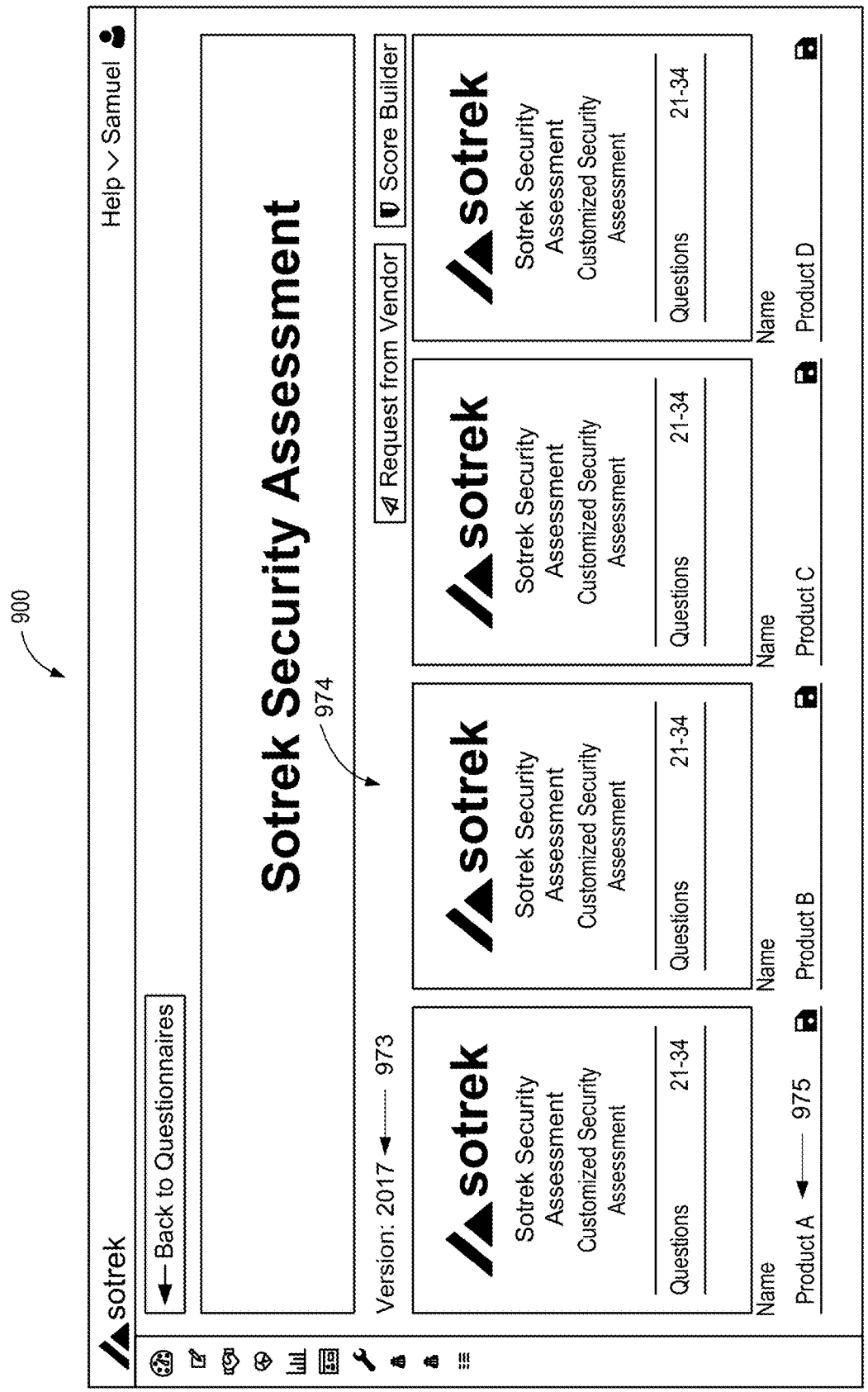
FIG. 9 is an interface for a security assessment management system that allows multiple versions of the same questionnaire to be completed for different products, according to one embodiment.

FIG. 9 illustrates a GUI 900 for a security assessment management system that a user may use to complete multiple versions of the same questionnaire for different products. In some embodiments, the user may leverage multiple profile versions to add questionnaires and documentation that are specific to different products sold by the user's company. In this embodiment, the user could complete different versions of the same questionnaire for each of the user's products and add each of those questionnaires to a unique profile built specifically for each different product. These questionnaires could be supplemented by different product-specific documentation that is unique by profile or that applies to the user's company as a whole. In another embodiment, the user may decide to build multiple profile versions for different types of customers, segmenting profiles by industry, geography or size, for example.

A version section 973 of the system displays the version of the questionnaire as determined by the set of questions asked in the questionnaire. For example, a standards body may issue updates to a standardized questionnaire each year containing new or updated questions, causing a new version of the questionnaire to be reflected in the system. The system organizes the different versions of the questionnaire by responses provided to the questions in the questionnaire in an assessment section 974. The system allows for the naming of each response version in a product section 975.

Responding to Security Questionnaires Using the System

Figure 10:
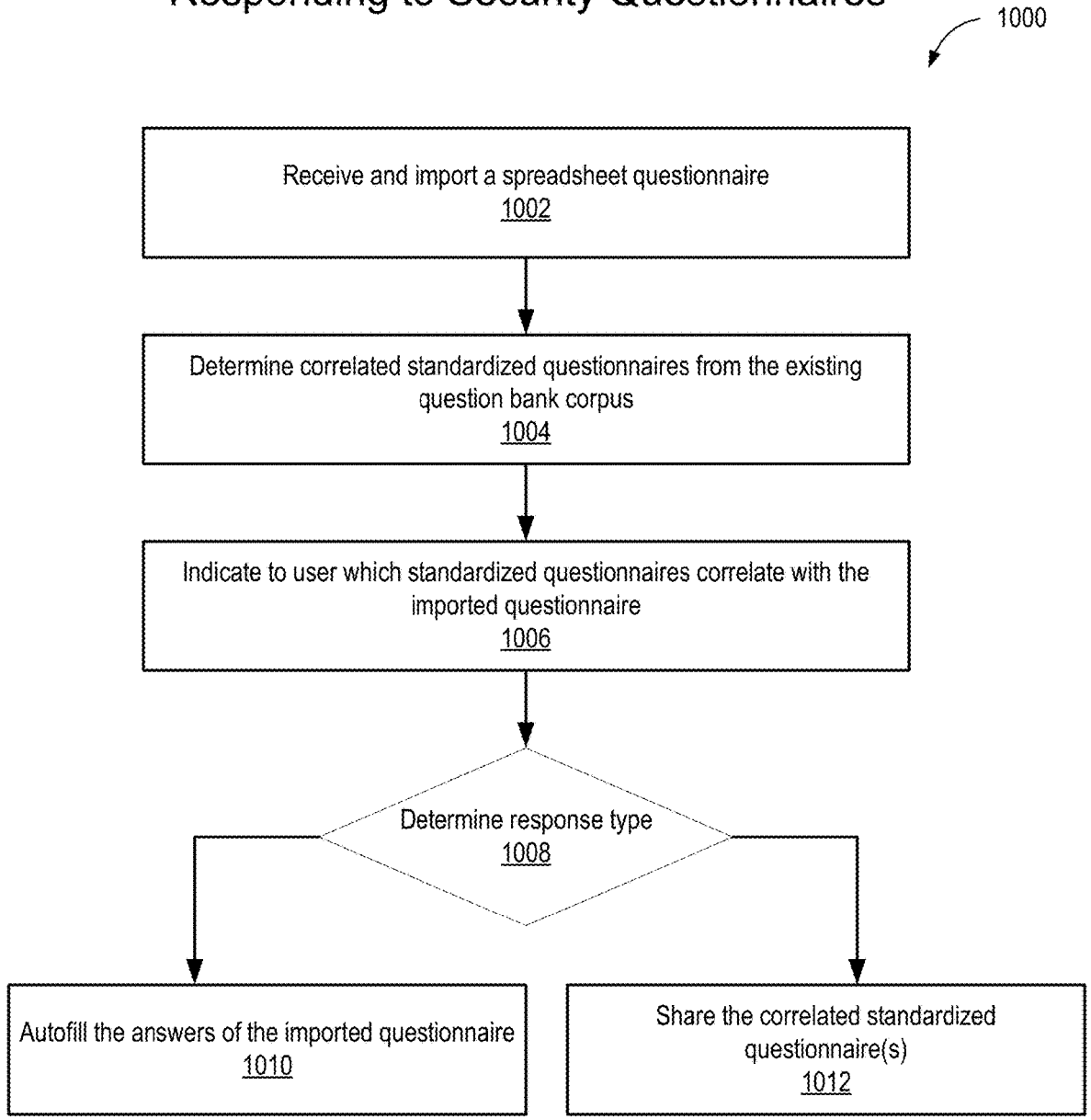
FIG. 10 illustrates a flow chart of a method for responding to security questionnaires using the system, according to one embodiment.

FIG. 10 illustrates a flow chart of a method 1000 for responding to security questionnaires using the system. The system receives and imports 1002 a spreadsheet questionnaire. In some embodiments, the system receives an ad-hoc spreadsheet questionnaire from a potential customer. For example, a user may use the import functionality described with reference to FIGS. 2 through 5 in order to import the questionnaire into the system.

The system determines 1004 correlated standardized questionnaires from the existing question bank corpus.

The system indicates to a user 1006 which existing standardized questionnaires correlate with the imported questionnaire. The system may indicate to the user that the spreadsheet contains questions that have a high level of correlation to questions from two standardized questionnaires. In some embodiments, the system may identify specific controls, sections, and questions that correlate to the imported questionnaire.

The system determines 1008 a desired response strategy. The system may allow the user to respond in a variety of ways. For example, the system may allow the user to decide whether to share 1012 a pre-completed, correlated, standardized questionnaire(s) or to auto-fill 1010 the responses to the imported questionnaire based on the correlated standardized questionnaires. In some embodiments the system may request that the user confirm each auto-filled response prior to sharing the completed response to the questionnaire. For example, if the user has already completed correlated standardized questionnaires, the system may allow the user to elect not to respond to the ad-hoc questionnaire directly but rather to share a version of the Security Profile™ that contains answers to both of those standardized questionnaires and associated documentation with the potential customer in order to satisfy their vendor assessment request. The system provides a potential customer with access to view the information supplied by the user in order to satisfy the vendor assessment.

In another example, the system receives an ad-hoc spreadsheet questionnaire that closely matches two previously-completed standardized questionnaires, but the user decides to use the system to respond to the ad-hoc questionnaire in its entirety. In this example, the system imported the questionnaire and compared it against existing standardized questionnaires that were previously answered and may use answers from the system's question bank to respond to the ad-hoc questionnaire. The question bank auto-mapping functionality (described with reference to FIG. 7 and FIGS. 11-13) within the system can pre-populate the answers using the closest matches, while ignoring answers to questions that do not meet a minimum standard of correlation. The minimum standard of correlation may be a threshold distance between scores indicating a presence of topics in the imported questionnaire and the existing questionnaires. In some embodiments, the user is able to review proposed matches, including other alternate answers, and accept or reject proposed and alternate matches based on their desired response. When the user completes the questionnaire, they have the ability to share the response back to the potential customer via the system or export the questionnaire into a spreadsheet format. Any of the responses that the user shares in a completed questionnaire, that were not previously stored in the question bank, will be delivered as potential alternate responses in future questionnaire scenarios.

How the Mapping Process Enhances Consumption of Questionnaire Results

In an embodiment where both the vendor and the customer are users of the system, the vendor is sent a questionnaire request via the system and in one embodiment may respond by leveraging the question bank mapping as described above, without the need to import a spreadsheet questionnaire. The vendor user may elect to respond to the request using their Security Profile™. For example, the system would allow the requester to see what percentage of the questions asked in their questionnaire are satisfied by the answers to similar questions already contained in the vendor's profile. This may eliminate the need for a vendor to respond to questions again and may enable the customer to satisfy a vendor security assessment in a fraction of the time (because the vendor can respond immediately instead of spending days or weeks to complete the questionnaire). In some embodiments, if the customer's questionnaire request was in the form of a spreadsheet sent outside of the system, and the vendor user decided to respond using their Security Profile™, the vendor user could import the questionnaire into the system and allow the system to communicate what percentage of the questions are mapped to questions already answered by the profile, without going through the effort of manually validating or editing the response to each question.

FIG. 11 illustrates a GUI 1100 for a security assessment management system that may allow both vendor and customer users of the system to view the contents of a security questionnaire as it relates to a variety of standardized or ad-hoc questionnaires at the same time. The system allows for the selection of standardized framework(s) or questionnaires to compare a given questionnaire against, and the system interface displays a matrix 1180 or other view giving the user the ability to see how both questions and responses compare across a variety of question sets.

The matrix 1180 displays a comparison of one questionnaire to other questionnaires. The filter 1181 of the system allows for the selection of which questionnaires the current questionnaire will be compared against. The row headers 1182 display the various controls or questions of the current questionnaire being compared. The column headers 1183 indicate which questionnaires are being compared against the current questionnaire. In cells 1184 of the matrix, in one embodiment, the system indicates which questionnaires contain matching questions or controls, or in another embodiment, which questionnaires contain questions or controls that are satisfied by the responses contained in the current questionnaire. In one embodiment, the system displays how questionnaires relate to each other. In another embodiment, the system displays how completely the responses to a given set of questions meet the requirements of other questionnaires or frameworks. In yet another embodiment, the system could facilitate the sharing of the matrix to communicate to any interested party how the products of the company satisfy the varying requirements of one or more questionnaires or frameworks.

The Mapping Process

Figure 12:
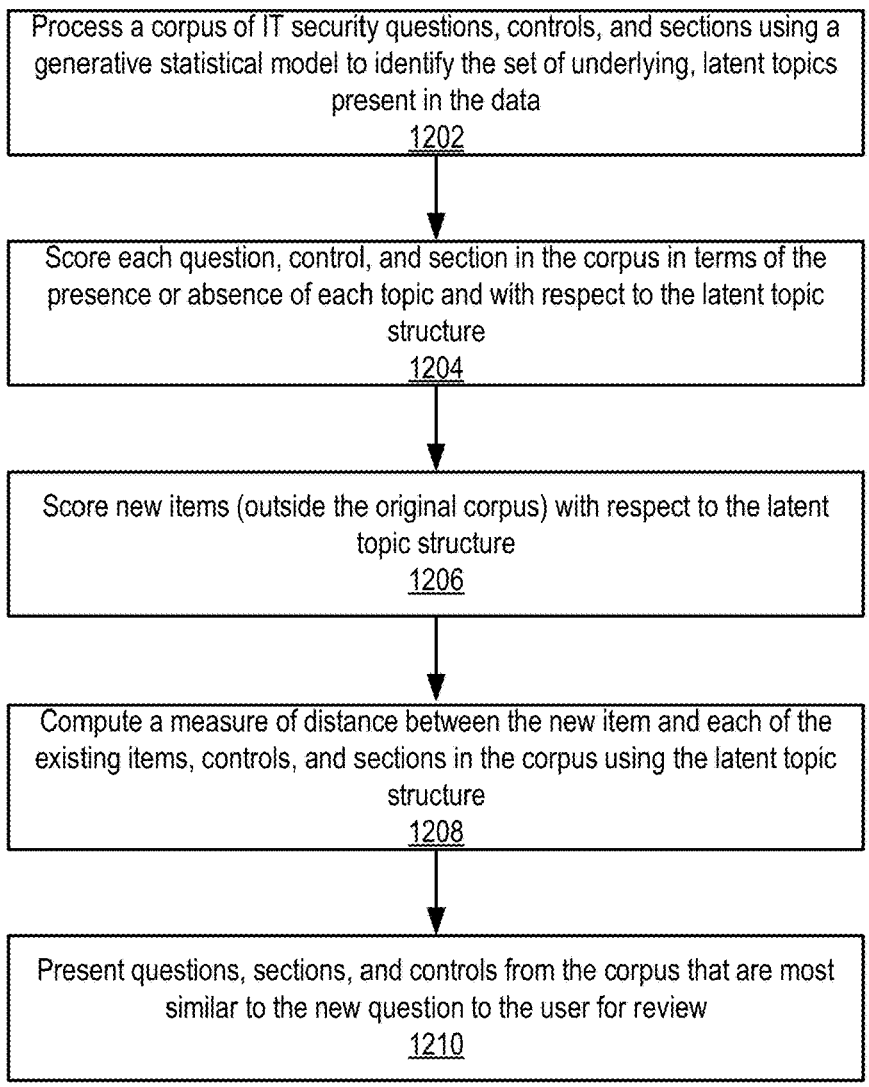
FIG. 12 illustrates a flow chart of a method for how matches are delivered via a Mapping Process, according to one embodiment.

The system delivers matches by leveraging the Mapping Process outlined in FIG. 12. FIG. 12 illustrates a flow chart of a method 1200 for how matches are delivered via the Mapping Process according to one embodiment. The method 1200 may process 1202 the full corpus of IT security questionnaires using a generative statistical model to identify a set of underlying, latent topics present in the data. For example, in some embodiments a system may use a Latent Dirichlet Allocation (LDA) model. In some embodiments, a system may use a deep neural network to build a binary classifier for identical security questions. For instance, the system may use a Siamese Recurrent Architecture to predict if security question pairs are related. In some embodiments, the result is a prediction of the probability that any pair of security question are identical. In some embodiments, a system may use a combination of LDA and a deep neural network. A system that uses LDA or deep neural network may use statistical modeling to cause identifying topics to emerge from the questions, controls, and sections. Processing the corpus of IT security questionnaires with the generative statistical model generates an output of a latent topic structure, also referred to as a latent topic distribution. The resulting latent topic structure provides a model of a distribution of the topics within the corpus. The corpus could include a collection of security questionnaires that include questions, standards, sections, and controls.

The method 1200 may score 1204 each question, control, and section in the corpus in terms of the presence or absence of each topic and with respect to the latent topic structure. The latent topic structure may be used to score both individual items (e.g., questions)—the collection of questions that reside in sections and controls—and a grouping of a section, control, and question. This may allow the system to compute a topic score for controls, sections, and questions that, in turn, can be used to compute similarities against new controls, sections, or questions.

New items (outside the original corpus) are scored 1206 with respect to the latent topic structure. The method includes computing 1208 a measure of distance between the new item and each of the existing items, controls, and sections in the corpus using the latent topic structure. The distance between the scores is a measure of how similar a new item is to each of the existing items, controls, and sections in the corpus. The measure of distance may be the difference between the topic scores of a new item relative to all the objects in the original corpus. The method 1200 may present 1210 questions, sections, and controls from the corpus that are most similar to the new question and are presented to the user for review.

In some embodiments, the method 1200 takes into account the structure of the section, control, or question as it processes matches. The system, therefore, not only searches for and evaluates matches based on each question's text, but it also takes related information in the context of a question into consideration (e.g., what section and control the question is found in). Using this method 1200, the system is able to score new questions on the same scale as existing questions and the system can continually update the existing crowd confidence scoring algorithm using new information as the system is utilized. The crowd confidence scoring ranks companies according to their risk level, based on their responses to the same set of questions within a questionnaire.

Figure 13:
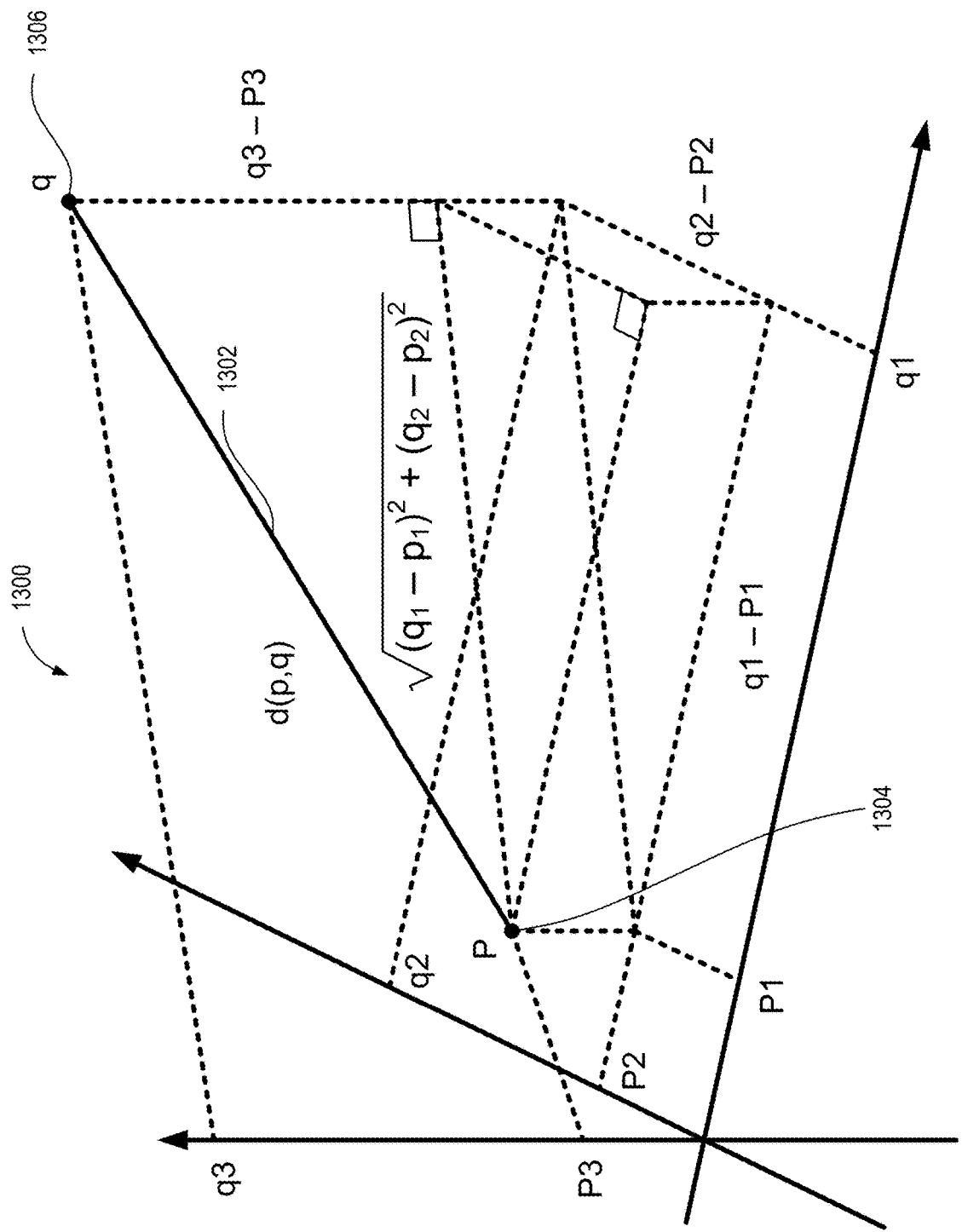
FIG. 13 is a graph depicting a distance between a first question and a new item in a latent topic distribution created using a generative statistical model, according to one embodiment.

FIG. 13 is a graph 1300 depicting a distance 1302 between a first question 1304 and a new item 1306 in a latent topic distribution created using a generative statistical model. The locations of the first question 1304 and the new item 1306 are determined by scoring the first question's 1304 and the new item's 1306 based on the presence or absence and number of occurrences of each topic within a set of topics. The distance 1302 is the straight line distance between the first question 1304 and the new item 1306 on the latent topic model. The similarities between the first question 1304 and the new item 1306 may be measured by computing the distance 1302. The distance may be computed using the scores as Cartesian coordinates where the first question 1304 and the new item 1306 are represented by p=(p1, p2, . . . , pn) and q=(q1, q2, . . . , qn) as two points in Euclidean n-space. Additionally, p1, p2, . . . , pn and q1, q2, . . . , qn may represent the presence or absence of each topic. The distance may be computed by solving for:

$$d(p, q) = \sqrt{\sum_{t=1}^{n} (q_t - p_t)^2}$$

Figure 14:
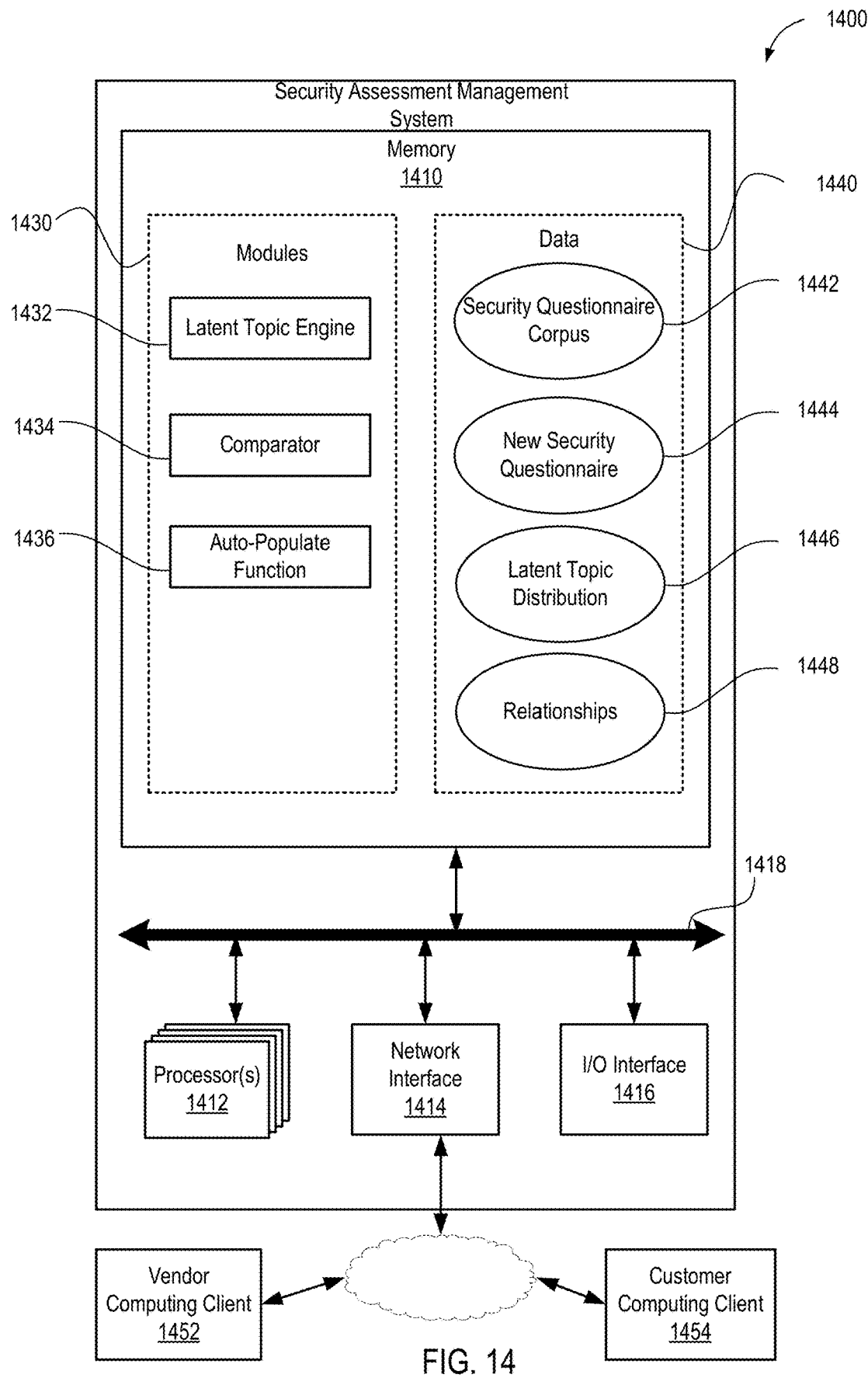
FIG. 14 is a block diagram of security assessment management system, according to one embodiment.

FIG. 14 is a block diagram of security assessment management system 1400, according to one embodiment. The security assessment management system 1400 may include an electronic memory 1410, one or more processors 1412, a network interface 1414, and an I/O interface 1416.

The electronic memory 1410 may include static RAM, dynamic RAM, flash memory, one or more flip-flops, or other electronic storage medium. The electronic memory 1410 may include a plurality of modules 1430 and data 1440. The modules 1430 may run multiple operations serially, concurrently or in parallel by or on the one or more processors 1412.

In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like.

The modules 1430 may include a latent topic engine 1432, a comparator 1434, and an auto-populate function 1436. The latent topic engine 1432 may cause the one or more processors 1412 to perform operations to identify a set of latent topics present in the text from the security questionnaire corpus 1442. In some embodiments, the latent topic engine 1432 may identify the set of latent topics by processing the original text using a generative statistical model. For example, in some embodiments the latent topic engine 1432 may use LDA. In some embodiments, the latent topic engine 1432 may use a deep neural network to build a binary classifier for identical security questions. For instance, the latent topic engine 1432 may use a Siamese Recurrent Architecture to predict if security question pairs are related. In some embodiments, the result is a prediction of the probability that any pair of security question are identical. In some embodiments, the latent topic engine 1432 may use a combination of LDA and a deep neural network. The latent topic engine 1432 may also determine a distribution of latent topics throughout questions, controls, and sections within the corpus of security questionnaires, wherein the distribution scores the questions, controls and sections based on a presence or absence of each topic within the set of latent topics. Further, the latent topic engine 1432 may also score a new text (e.g., new security questionnaire 1444) based on the presence or absence of each topic within the set of latent topics.

The comparator 1434 may compare a score of the new text of the security questionnaire to the scores within the distribution of latent topics throughout the questions, controls, and sections within the corpus of security questionnaires. The comparator 1434 may identify one or more questions, controls, or sections that are scored within the distribution that is nearest the score of the new text. The comparison may be accomplished by identifying a distance between the new text and questions, controls, or sections in the latent topic distribution. For example, the comparator 1434 may determine score differences between the original text from the corpus of security questionnaires and the new text from the new security questionnaire.

The auto-populate function 1436 may link or associate portions of the original text from the corpus of security questionnaires to portions of the new text from the new security questionnaire with a smallest score difference. In some embodiments, the auto-populate function 1436 may link an answer object associated with a portion of the original text to a portion of the new text linked to the portion of the original text, such that the answer object is common to both the portion of the original text and the portion of the new text. In some embodiments, the auto-populate function 1436 may populate an unanswered answer object associated with the new security questionnaire based on the portions of the original text that are linked to the portions of the new text.

The auto-populate function 1436 may also request manual user review through the I/O interface 1416 or via the network interface 1414. For example, the auto-populate function 1436 may request that portions of the original text and portions of the new text that are linked be displayed for review. In some embodiments, the auto-populate function 1436 is further to receive an input indicating acceptance or rejection of linking of the portions of the original text and the portions of the new text. In some embodiments, the auto-populate function 1436 may determine a standardized questionnaire within the corpus of security questionnaires that correlates to the new security questionnaire, and cause the standardized questionnaire to be transmitted as a response to the new security questionnaire. For example, the security assessment management system 1400 may transmit a related standardized questionnaire or a populated ad-hoc questionnaire to the customer computing client 1454 via the network interface 1414.

The data 1440 stored on the electronic memory 1410 may include the data 1440 generated by the security assessment management system 1400, such as by the modules 1430 or other modules. The data 1440 stored may be organized as one or more memory registers/addresses, files, and/or databases. The data 1440 may include a security questionnaire corpus 1442, a new security questionnaire 1444, a latent topic distribution 1446, and security questionnaire relationships 1448.

The security questionnaire corpus 1442 may include a plurality of security questionnaires. Each security questionnaire may be a spreadsheet categorized into sections, controls, and questions. Question fields may be associated with the questions and answer objects, or variables may be inserted into the question fields. The answer objects may be in a variety of formats such as text, multiple choice selection, or a number.

The new security questionnaire 1444 is a security questionnaire that has been imported or generated. For example, the new security questionnaire 1444 may be received from the vendor computing client 1452 through the network interface 1414. The latent topic distribution 1446 includes the latent topic scores of the sections, controls, and questions of the security questionnaire corpus 1442. The security questionnaire relationships 1448 define relationships between sections, controls, and questions of the security questionnaire corpus 1442 as well as relations between the new security questionnaire 1444 and the security questionnaire corpus 1442. The security questionnaire relationships 1448 may include references to each section, control, or question that may have a relationship.

The network interface 1414 may facilitate communication with other computing devices (e.g., vendor computing client 1452 and customer computing client 1454) and/or networks, such as the Internet and/or other computing and/or communications networks. The network interface 1414 may be equipped with conventional network connectivity. The network interface 1414 may be a wireless network interface, equipped with conventional wireless network connectivity technologies.

The I/O interface 1416 may facilitate interfacing with the security assessment management system 1400.

A system bus 1418 may facilitate communication and/or interaction between the other components of the security assessment management system 1400, including the electronic memory 1410, the one or more processors 1412, the network interface 1414, and the I/O interface 1416.

As can be appreciated, in other embodiments, the security assessment management system 1400 may be simpler than shown or described. For example, certain designs may forgo one or more components, such as memory, multiple processors, multiple interfaces, and the like, and instead execute instructions closer to or on bare metal (e.g., without intervening operating system or other software layer, executing instructions directly on logic hardware).

It will be obvious to those having skill in the art that many changes may be made to the details of the above-described embodiments without departing from the underlying principles of the invention. The scope of the present invention should, therefore, be determined only by the following claims.

The invention claimed is:

1. A system to establish a security profile, the system comprising:
   a memory to store:
      original text from a corpus of security questionnaires, and
      values associated with the original text from the corpus of security questionnaires, the values indicating a section, a control, or a question of the original text, the corpus of security questionnaires including one or more questionnaires in a standardized format; and
   a processing unit to:
      apply a generative statistical model to the original text to identify a set of latent topics present in the original text from the corpus of security questionnaires, wherein the set of latent topics comprise underlying topics in the original text that emerge through statistical modeling of the original text,
      score portions of the original text based on one or more of presence and absence of one or more latent topics of the set of latent topics present in the original text to generate a first set of topic scores for each of the portions of the original text, wherein the portions are identified based on the values associated with the original text, wherein the first set of topic scores are generated by:
         identifying presence or absence of each topic of the set of latent topics within the portions of the original text according to the distribution of latent topics, and
         determining a distribution of latent topics throughout the original text, wherein the first set of topic scores represent presence or absence of each topic of the set of latent topics within each of the portions of the original text,
      wherein the distribution of latent topics in the original text is scored for both individual questions and related groupings of sections, controls, and questions,
      generate a latent topic distribution model by using the first set of topic scores as coordinates for the portions of the original text, such that the portions are represented in the latent topic distribution model as points in Euclidean n-space,
      receive a new security questionnaire comprising new text from a user over a network, the new security questionnaire is provided in an ad-hoc format,
      segment the new security questionnaire into questions, sections, and controls,
      determine relationships between the questions, sections, and controls,
      map the new security questionnaire in the ad-hoc format to the corpus of security questionnaires including the one or more questionnaires in the standardized format by:
         scoring portions of the new text from the new security questionnaire based on presence or absence of the latent topics to generate a second set of topic scores for each portion of the new text by determining presence or absence of each topic of the one or more latent topics within the portions of the new text, wherein the second set of topic scores represent presence or absence of each topic of the one or more latent topics within each of the portions of the new text, wherein the second set of topic scores correspond to coordinates for the portions of the new text in Euclidean n-space of the latent topic distribution model, wherein the portions of the new text are scored for both individual questions and related groupings of sections, controls, and questions, updating the latent topic distribution model to include new points based on the coordinates for the portions of the new text, determining score differences between the scored portions of the original text from the corpus of security questionnaires and the scored portions of the new text from the new security questionnaire by determining a distance between the coordinates for the portions of the original text and the coordinates for the portions of the new text, linking the portions of the original text from the corpus of security questionnaires to the portions of the new text from the new security questionnaire with a smallest score difference such that existing information from the original text is mapped to requested information in the new text, wherein linking correlates one or more questions from the original text to one or more questions of the new text, auto-populate an unanswered answer object associated with the new security questionnaire in the ad-hoc format based on the corpus of security questions including the one or more questionnaires in the standardized format by:
  identifying an answered answer object from a portion of the original text that is linked to a portion of the new text comprising the unanswered answer object, and
  applying the answered answer object from the original text to the new text to answer the questions in the new text; and transmit a populated ad-hoc questionnaire to the user over the network, wherein the populated ad-hoc questionnaire includes answers to the questions within the new security questionnaire, the answers obtained from the original text.

2. The system of claim 1, wherein the memory is further used to store answer objects associated with portions of the original text, and
  wherein the processing unit is further to link an answer object associated with a portion of the original text to a portion of the new text linked to the portion of the original text, such that the answer object is common to both the portion of the original text and the portion of the new text.

3. The system of claim 1, wherein the processing unit is further to:
  cause portions of the original text and portions of the new text that are linked to be displayed for review, wherein the displayed portions of the original text comprises a first question from a first questionnaire and the displayed portions of the new text comprises a second question from the new security questionnaire; and
  receive an input from a responder indicating acceptance that answers to the first question should be used to answer the second question.

4. The system of claim 3, wherein the processing unit is further to receive an input indicating acceptance or rejection of linking of the portions of the original text and the portions of the new text.

5. The system of claim 1, wherein the processing unit is further to identify the set of latent topics by processing the original text using a generative statistical model.

6. The system of claim 1, wherein the processing unit is further to determine a standardized questionnaire within the corpus of security questionnaires that correlates to the new security questionnaire.

7. The system of claim 6, wherein the processing unit is further to cause the standardized questionnaire to be transmitted as a response to the new security questionnaire.

8. The system of claim 1, wherein the system further comprises a user interface to display possible correlated questions and receive feedback from a user indicating acceptance or rejection of a correlation between the possible correlated questions,
  wherein the feedback is incorporated into future mapping decisions.

9. A method of responding to a security questionnaire, the method comprising:
  applying a generative statistical model to the original text to identify a set of latent topics present in a corpus of security questionnaires, wherein the set of latent topics comprise underlying topics in the original text that emerge through statistical modeling of the corpus of security questionnaires, the corpus of security questionnaires including one or more questionnaires in a standardized format;
  determining a distribution of latent topics throughout questions, controls, and sections within the corpus of security questionnaires, wherein the distribution scores the questions, controls, and sections based on a presence or absence of each latent topic within the set of latent topics such that the distribution comprises a set of topic scores for each of the of the questions, controls, and sections,
    wherein the distribution of latent topics within the corpus of security questionnaires is scored for both individual questions and related groupings of sections, controls, and questions;
  generating a latent topic distribution model by using the set of topic scores as coordinates for the questions, controls, and sections of the original text, such that the questions, controls, and sections are represented in the latent topic distribution model as points in Euclidean n-space,
  receiving a new security questionnaire comprising new text from a user over a network, the new security questionnaire is provided in an ad-hoc format;
  segmenting the new security questionnaire into questions, sections, and controls;
  determining relationships between the questions, sections, and controls;
  mapping the new security questionnaire in the ad-hoc format to the corpus of security questionnaires including the one or more questionnaires in the standardized format by:
    scoring the new text based on the presence or absence of each latent topic within the set of latent topics to generate a topic score for the new text by determining the presence or absence of each topic of the set of latent topics within the new text, wherein the topic scores represent the presence or absence of each topic of the set of latent topics within each of the portions of the new text, wherein the topic scores for the new text correspond to coordinates for the new text in Euclidean n-space of the latent topic distribution model;

wherein the portions of the new text are scored for both individual questions and related groupings of sections, controls, and questions, updating the latent topic distribution model to include new points based on the coordinates for the portions of the new text, comparing the topic score of the new text to the distribution of latent topics throughout the questions, controls, and sections within the corpus of security questionnaires by determining a distance between the coordinates for the portions of the original text and the coordinates for the new text;

identifying a question, control, or section that is scored within the set of topic scores of the distribution nearest the topic score of the new text;

associating the new text and the identified question, control, or section such that existing information from the corpus of security questionnaires is mapped to requested information in the new text, wherein mapping correlates one or more questions from the original text to one or more questions of the new text; and populating an unanswered question field associated with the new text in the new security questionnaire in the ad-hoc format based on the corpus of security questions including the one or more questionnaires in the standardized format by:

identifying an answer variable associated with the identified question, control, or section, and applying the answered answer object from the original text to the new text to answer the questions in the new text; and transmitting a populated ad-hoc questionnaire to the user over the network, wherein the populated ad-hoc questionnaire includes answers to the questions within the new security questionnaire, the answers obtained from the original text.

10. The method of claim 9, further comprising displaying the new text and the identified question, control, or section for review.

11. The method of claim 10, further comprising receiving an input indicating acceptance or rejection of an association between the new text and the identified question, control, or section.

12. The method of claim 9, wherein a generative statistical model is used to identify the set of latent topics.

13. The method of claim 9, further comprising determining a standardized questionnaire within the corpus of security questionnaires that correlates to the new text.

14. A system for responding to security questionnaires, the system comprising:

a memory to store a corpus of security questionnaires, the corpus of security questionnaires including one or more questionnaires in a standardized format; and a processor to:

apply a generative statistical model to the original text to identify a set of latent topics present in the corpus of security questionnaires, wherein the set of latent topics comprise underlying topics in the original text that emerge through statistical modeling of the corpus of security questionnaires;

determine a distribution of latent topics throughout questions, controls, and sections within the corpus of security questionnaires, wherein the distribution scores the questions, controls, and sections based on a presence or absence of each topic within the set of latent topics such that the distribution comprises a set of topic scores for each of the of the questions, controls, and sections, wherein the distribution of latent topics in the corpus of security questionnaires is scored for both individual questions and related groupings of sections, controls, and questions;

generate a latent topic distribution model by using the set of topic scores as coordinates for the questions, controls, and sections of the original text, such that the questions, controls, and sections are represented in the latent topic distribution model as points in Euclidean n-space;

receive a new security questionnaire comprising new text from a user over a network, the new security questionnaire is provided in an ad-hoc format, segment the new security questionnaire into questions, sections, and controls, determine relationships between the questions, sections, and controls, map the new security questionnaire in the ad-hoc format to the corpus of security questionnaires including the one or more questionnaires in the standardized format by:

scoring the new text based on the presence or absence of each topic within the set of latent topics to generate a topic score for the new text by determining the presence or absence of each topic of the set of latent topics within the new text, wherein the topic scores represent the presence or absence of each topic of the set of latent topics within each of the portions of the new text, wherein the topic scores for the new text correspond to coordinates for the new text in Euclidean n-space of the latent topic distribution model;

wherein the portions of the new text are scored for both individual questions and related groupings of sections, controls, and questions, updating the latent topic distribution model to include new points based on the coordinates for the new text;

comparing the topic score of the new text to the distribution of latent topics throughout the questions, controls, and sections within the corpus of security questionnaires by determining a distance between the coordinates for the portions of the original text and the coordinates for the new text;

identifying a question, control, or section that is scored within the set of topic scores of the distribution nearest the topic score of the new text;

associating the new text and the identified question, control, or section such that existing information from the corpus of security questionnaires is mapped to requested information in the new text;

wherein mapping correlates one or more questions from the original text to one or more questions of the new text;

populate an unanswered question field associated with the new text in the ad-hoc format based on the corpus of security questions including the one or more questionnaires in the standardized format by:
  identifying an answer variable associated with the identified question, control, or section, and
  applying the answered answer object from the original text to the new text to answer the questions in the new text; and
transmit a populated ad-hoc questionnaire to the user over the network, wherein the populated ad-hoc questionnaire includes answers to the questions within the new security questionnaire, the answers obtained from the original text.

15. The system of claim 14, wherein the processor is further to request that the new text and the identified question, control, or section for review be displayed for review.

16. The system of claim 15, wherein the processor is further to receive an input indicating acceptance or rejection of an association between the new text and the identified question, control, or section.

17. The system of claim 14, wherein a generative statistical model is used to identify the set of latent topics.

18. The system of claim 14, wherein the processor is further to determine a standardized questionnaire within the corpus of security questionnaires that correlates to the new text.

19. The system of claim 18, wherein the processor is further to cause the standardized questionnaire to be transmitted as a response to the new text.

\* \* \* \* \*